W. H. SCOTT.
MOTOR CONTROL SYSTEM.
APPLICATION FILED JAN. 30, 1920.
1,434,158.
Patented Oct. 31, 1922.
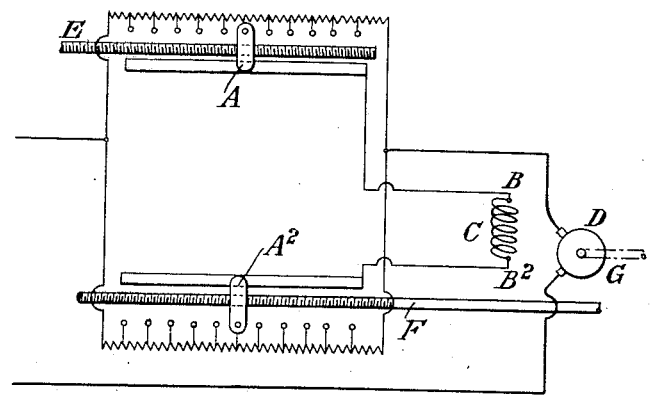
INVENTOR
WILLIAM HARDING SCOTT
BY
ATTORNEYS

Patented Oct. 31, 1922.

1,434,158

UNITED STATES PATENT OFFICE.

WILLIAM HARDING SCOTT, OF NORWICH, ENGLAND.

MOTOR-CONTROL SYSTEM.

Application filed January 30, 1920. Serial No. 355,191.

(GRANTED UNDER THE PROVISIONS OF THE ACT OF MARCH 3, 1921, 41 STAT. L., 1313.)

*To all whom it may concern:*

Be it known that I, WILLIAM HARDING SCOTT, a subject of the King of Great Britain, residing at Gothic Works, Norwich, in the county of Norfolk, England, have invented new and useful Improvements in Motor-Control Systems, (for which an application for patent in Great Britain was filed on February 19, 1914, Patent No. 4,323/14), of which the following is a specification.

My invention relates to electric telemotors for reproducing movements at a distance.

As my invention is especially applicable for use in connection with steering gear (although it is not limited thereto) I will, in describing it, presume that it is applied to steering gear from which its other applications will also be understood.

The action of devices in accordance with my invention is based on the principle of the Wheatstone bridge arrangement, one adjustable leg of such an arrangement being operated by the steering wheel, the other adjustable leg being brought into coincidence by the motion of the rudder.

The power available when the movable contacts of the two legs of the Wheatstone bridge arrangement are only slightly out of coincidence is very small, and the object of my invention is to overcome the difficulty incidental to this fact and thereby provide apparatus capable of practical use.

According to my invention I connect the movable contacts of the two legs of a Wheatstone bridge arrangement to the ends of the field magnet winding of an electric motor (which may be a server motor, on the principle, or any other suitable, motor) and I cause the current which is constantly passing through the two legs of the Wheatstone bridge to pass also through the armature of such motor.

When the brushes, or contact makers, are in the mid-position, this current in the armature will not produce any torque if the field magnets be not excited, but a small excitation of the field magnets will cause considerable turning moment to be exerted in the one direction, or the other, and the motor then turns the control gear in one direction, or the other, according to the direction of current in the field magnet thereof the direction and amount of the current being affected in the relative positions of the movable contacts on the two legs of the Wheatstone bridge arrangement. When the said contacts are both in coincidence, or the same relative positions, that is, when the legs are in equi-potential position there will be no excitation of the said motor field magnets but otherwise the said motor will operate the controller so as to make the motor which actuates the gear, turn the movable contact of the rudder leg of the Wheatstone bridge arrangement in the direction to bring this leg into coincidence with the other, or wheel, leg, and, when coincidence is attained, the excitation of the aforesaid field magnets will stop.

The steering gear, or rudder, contact follows the motion of the steering wheel contact and stops at a step corresponding to that at which the steering wheel contact stops.

According to this invention therefore the constant, or approximately constant, current which flows through the two legs of the Wheatstone bridge is passed through the armature of the aforesaid motor, and its magnets are excited in one direction, or the other, by means of the small current which flows between the movable contacts of the Wheatstone bridge, in one direction, or the other, when these contacts are not in coincidence, or corresponding positions, that is in equi-potential position, on the two legs of the Wheatstone bridge.

The accompanying diagram illustrates an arrangement in accordance with my invention.

A A², are the movable contacts on the Wheatstone bridge, which contacts are electrically connected, at B B², to the terminals of the exciting magnet coil C, of the aforesaid motor, indicated at D. The contacts A A², are carried by nuts capable of running on screws E, and F, when these are rotated respectively by the steering wheel and by the rudder. As illustrated in my British Patents 73/14 and 6424/14, a motor such as D, can work a controller which will control a main motor which operates the rudder until the motion of the rudder, by rotating the screw F, brings the contact A², into coincidence, or equi-potential position, with the contact A, when, as hereinbefore described, the motor D, will cease to have any torque imparted to it and the reversing controller will return to the off position under, for example, the action of weights, or springs, against which the motor D, is operated, or of any known, or suitable, arrangement of hunting gear switch such, for instance, as those which are used in connection with steam operated steering gear.

The invention can be applied to other purposes than steering, for instance, instead of the motor D, operating a steering arrangement, it may similarly operate other apparatus, such, for example, as a searchlight projector, or a light gun, the armature of the motor D, being geared onto the screw F, as well as onto the work to be done, so that the contact A², is brought into coincidence with the contact A, on the screw E, at the other leg of the Wheatstone bridge.

What I claim is:—

In electric telemotors for reproducing movements at a distance by a Wheatstone bridge arrangement, means for passing the main current which passes through the resistances of the Wheatstone bridge through the armature of a server, or other, motor, and means in connection with the movable contacts of the said bridge, whereby the magnets of such motor are excited by the current which passes between the said movable contacts when they are out of coincidence, or equi-potential position.

In testimony whereof I have signed my name to this specification in the presence of two subscribing witnesses.

WILLIAM HARDING SCOTT.

Witnesses:
P. A. THOULESS,
EVA M. MAYERS.